United States Patent [19]

Schuermann

[11] Patent Number: 5,455,575
[45] Date of Patent: Oct. 3, 1995

[54] MULTI-INTERROGATOR, DATACOM AND TRANSPONDER ARRANGEMENT

[75] Inventor: Josef Schuermann, Oberhummel, Germany

[73] Assignee: Texas Instruments Deutschland GmbH, Germany

[21] Appl. No.: 311,827

[22] Filed: Sep. 23, 1994

Related U.S. Application Data

[63] Continuation of Ser. No. 973,105, Nov. 6, 1992, abandoned.

[51] Int. Cl.$^6$ ............................ G01S 13/75; G01S 13/76
[52] U.S. Cl. ..................... 342/42; 342/44; 342/50; 342/51
[58] Field of Search ................. 342/42, 44, 50, 342/51

[56] References Cited

U.S. PATENT DOCUMENTS

| | | | |
|---|---|---|---|
| 3,870,994 | 3/1975 | McCormick et al. | 342/42 |
| 4,060,805 | 11/1977 | McComas | 342/38 |
| 4,179,695 | 12/1979 | Levine et al. | 342/37 |
| 4,229,737 | 10/1980 | Heldwein et al. | 342/46 |
| 4,631,708 | 12/1986 | Wood et al. | 367/2 |
| 4,646,090 | 2/1987 | Mawhinney | 342/44 |
| 4,688,026 | 8/1987 | Scribner et al. | 340/572 |
| 4,759,051 | 7/1988 | Han | 379/59 |
| 4,827,395 | 5/1989 | Anders et al. | 364/138 |
| 4,910,521 | 3/1990 | Mellon | 342/45 |
| 4,912,471 | 3/1990 | Tyburski et al. | 342/42 |
| 5,051,741 | 9/1991 | Wesby | 342/44 X |
| 5,053,774 | 10/1991 | Schuermann et al. | 342/44 |
| 5,164,985 | 11/1992 | Nysen et al. | 342/44 X |
| 5,192,954 | 3/1993 | Brockelsby et al. | 342/42 |
| 5,227,803 | 7/1993 | O'Connor et al. | 342/442 |
| 5,252,979 | 10/1993 | Nysen | 342/50 |

FOREIGN PATENT DOCUMENTS

| | | | |
|---|---|---|---|
| 0308964 | 3/1989 | European Pat. Off. | G01S 13/82 |
| 2142202 | 1/1985 | United Kingdom | G01S 13/06 |

*Primary Examiner*—John B. Sotomayor
*Attorney, Agent, or Firm*—Brian C. McCormack; James C. Kesterson; Richard L. Donaldson

[57] ABSTRACT

A multi-interrogator transponder arrangement is disclosed. The transponder arrangement comprises a first interrogation unit (10) comprising a first wireless datacom transceiver (19) which transmits at least one RF interrogation signal. The arrangement also comprises a second interrogation unit (16) comprising a second wireless datacom transceiver which is in wireless communication with the first wireless datacom transceiver 19. The arrangement still further comprises a responder unit (12) which upon receipt of the RF interrogation signal transmits data stored therein back to the first interrogation unit 10 in the form of a responsive RF communication, the responder unit (12) comprising a responder unit energy accumulator (136) which stores energy contained in the RF interrogation signal. Other devices, systems and methods are also disclosed.

12 Claims, 1 Drawing Sheet

MULTI-INTERROGATOR, DATACOM AND TRANSPONDER ARRANGEMENT

This application is a Continuation, of application Ser. No. 07/973,105, filed Nov. 6, 1992 now abandoned.

CROSS-REFERENCE TO RELATED PATENTS

The following coassigned patent application is hereby incorporated herein by reference:

| U.S. Pat. No/U.S. Appl. No. | Filing Date | TI Case No. |
| --- | --- | --- |
| 5,053,774 | 2/13/91 | TI-12797A |

1. Field of the Invention

This invention generally relates to a transponder arrangement comprising an interrogation unit which transmits at least one RF interrogation signal to a responder unit which thereupon sends data stored therein back to the interrogation unit in the form of a modulated RF carrier. The interrogation unit of the present invention is further operable to transmit data to another or other interrogation units in a wireless fashion.

2. Background of the Invention

There is a great need for devices or apparatuses which make it possible to identify or detect as regards their presence at a predetermined location objects which are provided with such devices or apparatuses in contactless manner and over a certain distance. Within the context of such identification of objects by an interrogator unit which detects the presence of responder units within such objects, an additional need exists to be able to communicate in contactless fashion between such interrogator units.

It is, for example, desirable to request contactless and over a certain distance identifications which are uniquely assigned to an object and which are stored in the device or apparatus so that, for example, the object may be identified. An example is also the case in which physical parameters such as the temperature or the pressure are to be interrogated directly at or within the object, without direct access to the object being possible. A device or apparatus of the type desired can, for example, be attached to an animal which can then always be identified at an interrogation point without direct contact. A further example of a case in which such a device is needed is the computer controlled industrial production in which, without the intervention of operating personnel, components are taken from a store, transported to a production location and there assembled to give a finished product. In this case a device is required which can be attached to the individual components so that the components can be specifically detected in the spares store and taken therefrom.

A determination may also be made as to whether or not a particular object exists within a given reading range. The type of arrangement described above wherein communication between interrogator units would have great utility in conjunction with the ability to determine whether or not a particular object exists within a given reading range. In such an instance, if it were determined that an object did not exist within an interrogator unit's given reading range, the interrogator unit might request from neighboring interrogator units a search within their respective reading ranges. The neighboring interrogator units might then respond affirmatively or negatively as regards to the presence of the particular object.

SUMMARY OF THE INVENTION

The needs outlined in the background of the invention can be met with the inventive concept disclosed hereinbelow. For universal usability of such an arrangement the interrogation or enquiry unit is preferably handy and compact so that it withstands rough treatment in practice. The interrogation unit may operate solely, or in conjunction with other compact or stationary-type interrogators which can communicate with responders as well as among each other.

The responder is preferably very small so that it can readily be attached to, or inserted in, the objects to be detected. The responder unit is to be constructed so that it has a very low energy requirement and does not need its own power source which after a certain time would have to be renewed, or alternatively, battery-powered transponders could also be used.

In one embodiment of the invention a multi-interrogator transponder arrangement is constructed. This interrogator unit comprises a first interrogation unit which transmits at least one RF interrogation signal. The interrogator unit comprises: a first microprocessor, a first carrier wave generator whose oscillation may be initiated by said first microprocessor, a first modulator, a first output amplifier, a first antenna, a first input amplifier, and a first demodulator. The first modulator is controlled by said first microprocessor for modulating said oscillations of said first carrier wave generator. The first output amplifier is for amplifying the output of said first carrier wave generator. The first antenna receives at a signal input the output of said first output amplifier and generates a first wireless data communication into a transmitting medium and further receives a second wireless data communication from said transmitting medium and makes a first received signal available at its output. The first input amplifier receives said first received signal from said output of said first antenna and produces a first amplified received signal at its output. The first demodulator is for demodulating said first amplified received signal and making a first demodulated bit stream available at its output to be received by said first microprocessor. The arrangement further comprises a second interrogation unit which in turn comprises: a second microprocessor, a second carrier wave generator whose oscillation may be initiated by said second microprocessor, a second modulator, a second output amplifier, a second antenna, a second input amplifier, and a second demodulator. The second modulator is controlled by said second microprocessor for modulating said oscillations of said second carrier wave generator. The second output amplifier is for amplifying the output of said second carrier wave generator. The second antenna receives at a signal input the output of said second output amplifier and generates said second wireless data communication into said transmitting medium and further receives said first wireless data communication from said transmitting medium and makes a second received signal available at its output. The second input amplifier receives said second received signal from said output of said second antenna and produces a second amplified received signal at its output. The second demodulator for demodulating said second amplified received signal and making a second demodulated bit stream available at its output to be received by said second microprocessor. The arrangement still further comprises a responder unit which upon receipt of said RF interrogation signal transmits data stored therein back to said first interrogation unit in the form of a modulated RF carrier, said responder unit comprising a responder unit energy accumulator which stores energy contained in said RF interrogation signal and a responder unit RF carrier wave generator.

Another possible application of this invention would be in the field of paging devices, that is to say, applications in which a dispatcher could make an inquiry using a stationary interrogator unit to determine presence of workers which carry other interrogator units. If the dispatcher determines positively that other interrogator units are nearby, the dispatcher might send a message via their communication link between interrogator units to a worker carrying such unit. This message could appear, by way of example, in a display of the worker's interrogation unit after a notification sound. In a more elaborate scheme, a network of responder units might be placed throughout a building, each responder unit having an address corresponding to a physical location within the building. The dispatcher could then, using the inter-interrogation unit communication link, request that any interrogation unit within proximity of certain physical locations respond to an inquiry thereto. The interrogation units could then determine their location by sending an interrogation signal to the nearby responder units requesting their physical location information stored therein. In such a manner, a dispatcher could send directions only to those workers efficiently able to respond to such directions.

Advantageous further developments are characterized in the subsidiary claims.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
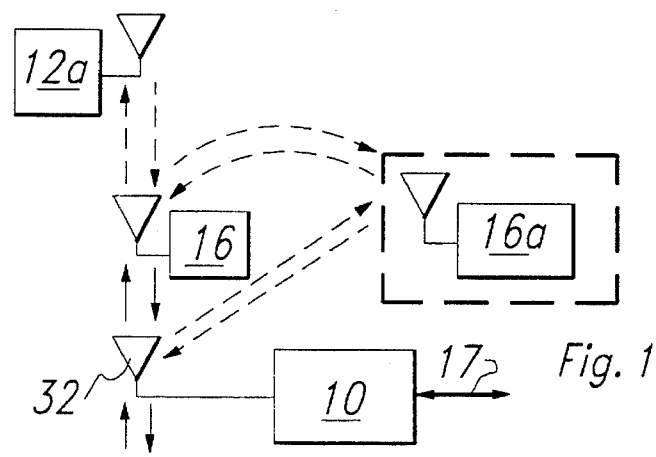
FIG. 1 is a block circuit diagram of a preferred arrangement of interrogation units and responder units according to the invention.

Referring now to FIG. 1, the transponder arrangement to be described includes a first interrogation unit 10 and a responder unit 12. The interrogation unit 10 is constructed as a stationary unit which would primarily remain in a fixed position. Alternatively, the interrogation unit 10 might be a unit to be held in the hand of an operator. The interrogation unit 10 will transmit an RF interrogation signal upon receipt of a user input, or by an automated command such as by computer control. This interrogation unit 10 also has the capacity of receiving responsive RF signals from the responder unit 12, and for detecting information contained in such responsive signals. Accommodation for interrogation unit 10 to communicate with a host computer might be accomplished via data bus 17, such that the interrogator unit 10 might receive commands from the host computer or transmit data to and from the host computer.

Still referring to FIG. 1, the interrogation unit 10 is associated with at least one other interrogation unit 16 which is constructed as a handheld unit. In FIG. 1 an additional interrogation unit 16a is shown surrounded by a dashed box. This interrogation unit 16a is shown in wireless contactless communication with the interrogation units 10, 16 by dashed line connection. It will be readily apparent that interrogation unit 10 might be a handheld unit or a stationary unit while interrogation units 16, 16a might be portable or stationary, as well. The other interrogation unit 16 is in contactless or wireless electrical communication with the first interrogation unit 10 and may be in contactless communication with an additional responder unit or units 12a. Any combination of handheld and stationary units are readily apparent to one of ordinary skill in the art and therefore the appended claims encompass any such modifications or embodiments. Many additional interrogation unit 16a or responder units 12a might be used in a given transponder arrangement.

Figure 2:
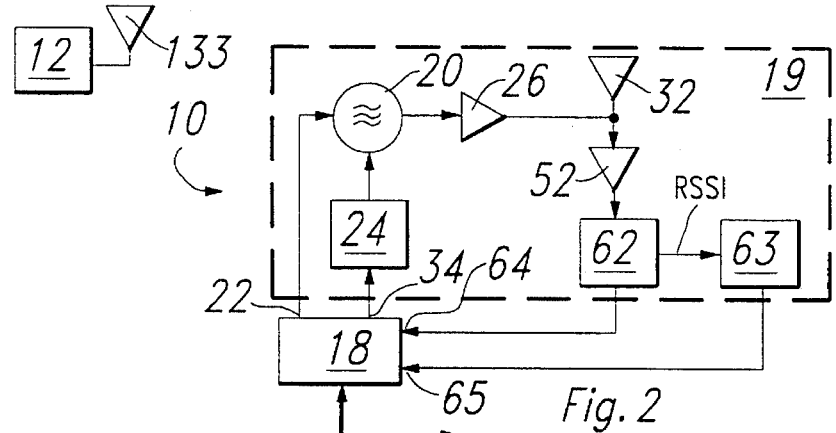
FIG. 2 is a block circuit diagram of the interrogator unit according to the invention.

Referring now to FIG. 2, the interrogation unit 10 contains as central control unit a microprocessor 18 which is responsible for the control of the function sequences. A wireless datacom transceiver 19 under control of microprocessor 18 is responsible for communications with other interrogation units having other wireless datacom transceivers and for communication with responder units 12, 12a. The wireless datacom transceiver 19 comprises an RF oscillator 20 which generates RF oscillations as soon as it has been set in operation by a signal at the output 22 of the microprocessor 18. Further components which are preferably contained within the wireless datacom transceiver 19 include a modulator 24, an output amplifier 26, an antenna 32, an input amplifier 52, and a demodulator 62.

The oscillations of RF oscillator 20 may be modulated by a modulator 24 which is controlled by an output 34 of the microprocessor 18. The output signal of the RF oscillator 20 is supplied by an amplifier 26 to an antenna 32 which transmits the RF interrogation signal supplied to it by the oscillator 20 and receives the RF signal sent back by the responder unit 12. The RF signals received by the antenna 32 are supplied by an amplifier 52 which is so designed that it amplifies the RF signals received. The output of the amplifier 54 5 is connected to a demodulator 62 which from the signal supplied thereto generates a demodulated data stream which is supplied to the input 64 of the microprocessor 18. Additionally, in the preferred embodiment, demodulation circuit 62 provides a signal by which another demodulation circuit 63, preferably an amplitude shift keying demodulation circuit, may demodulate a wireless communication such as from another interrogation unit 16, 16a.

The information contained in the RF signal received may be supplied after the demodulation via the microprocessor 18 to a random access memory, or, if the interrogator unit is so equipped, it may be transmitted by an optional databus 17 to a host computer, personal computer, or other computing device. Alternatively, the information may be displayed on a display device to advise the user of the information received.

Figure 3:
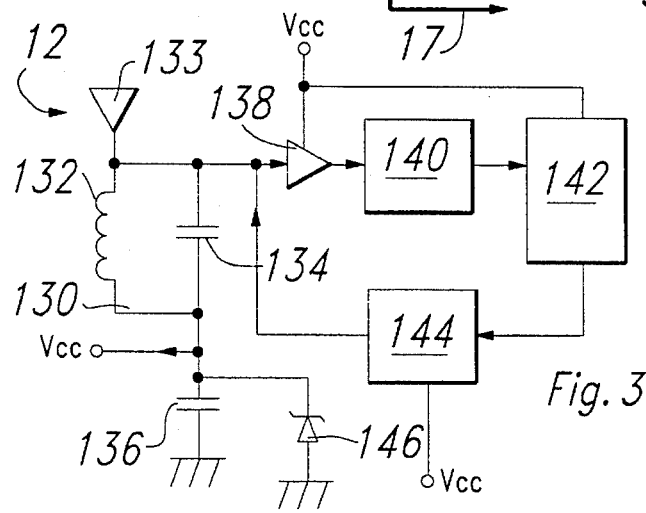
FIG. 3 is a block circuit diagram of the responder unit according to the invention.

The responder unit 12 illustrated in FIG. 3 contains for reception of the RF interrogation signal an antenna 133, and a parallel resonant circuit 130 having a coil 132 and a capacitor 134. Connected to the parallel resonant circuit 130 is a capacitor 136 serving as energy accumulator. A zener diode 146 is connected in parallel to capacitor 136. Together, capacitor 136 and zener diode 146 serve as a power supply of voltage $V_{cc}$ for the responder unit 12. The responder unit 12 may continue to operate as long as the energy stored in capacitor 136 is sufficient to maintain the voltage $V_{cc}$ to a minimum operating voltage to such circuitry as resides in the responder unit 12. In addition the parallel resonant circuit 130 is connected in a preferred embodiment to an input conditioning circuitry 138 such as an input amplifier. This input conditioning circuit 138 is operable to condition the signal received by the antenna 133 and parallel resonant circuit 130. A demodulator 140 might then optionally demodulate the signal and pass the demodulated signal on to logic circuit 142. If, however, the responder unit 12 is not meant to receive information, the conditioning circuitry 138 might simply send a signal directly to logic circuit 142 indicating the presence of an interrogation signal. In either instance, the responder unit 12 is typically constructed to respond to an interrogation signal by outputting a signal containing data from logic circuit 142 to a modulator circuit 144. The modulator circuit 144 then preferably acts upon resonant circuit 130 to perhaps alter the resonant frequency in response to information from logic circuit 142. Preferably, this might be done using a switched parallel capacitor or set of switched capacitors which changes the resonant frequency depending on the received data. Further details of the interrogator unit to responder unit communications are covered within U.S. Pat. No. 5,053,774 by Schuermann, incorporated by reference herein.

Referring now to FIGS. 1–3 the interrelation of the different transponder elements will now be described. In practical use, numerous objects, each provided with a responder unit 12, are addressed in succession, or in a broadcast message, by the interrogation unit 16 by transmission of an RF interrogation signal. The information returned by the responder units 12 is received by the interrogation unit 16 and stored in a memory therein or, in the case of another, stationary, interrogation unit 10, be transmitted by a data bus 17 to a host computer. As a handheld interrogation unit 16 interrogates a number of responder units 12, its internal memory would begin to fill with information received by the responder units 12. In such an instance, the handheld interrogation unit 16 would ideally transmit the information from its internal memory in a wireless fashion to stationary interrogation unit 10, thereby relieving itself from maintaining such information in its internal memory.

In the construction described in each case, the responder units 12 which are within the transmitting range of the interrogation unit 16 are addressed. It may, however, also be desirable to address a larger number of responder units 12 which may be outside the transmitting range of the interrogation unit 16, but within the transmitting range of another interrogation unit 16a. By enabling interrogation unit 16 to communicate with another interrogation unit 16a, over a distance not possible between an interrogation unit 16, 16a and a responder unit 12, it is possible for interrogation unit 16 to indirectly locate responder unit 12 by making an inquiry of interrogation unit 16a. In this manner, amongst a large number of objects provided with responder units 12 it is possible to specifically search for and find units, including those units which are outside the transmitting range of a first interrogation unit 16, but within the transmitting range of another interrogation unit 16a.

Still referring to FIGS. 1–3, the communication between interrogation units 10, 16 and responder units 12, 12a will now be described. Interrogation units 10, 16 generally communicate with each other and with responder units 12, 12a using wireless datacom transceiver 19. Preferably, first interrogation unit 10 has a first wireless datacom transceiver 19 through which it may communicate with a first responder unit 12 or a second interrogation unit 16. Alternately, first interrogation unit 10 may communicate with another interrogation unit 16a or another responder unit 12a through this first wireless datacom transceiver 19. The second interrogation unit 16 or the other interrogation unit 16a would preferably have a construction similar to first interrogation unit 10, including a second wireless transceiver with which it might communicate with first interrogation unit 10, another interrogation 16a, or a responder unit 12, 12a. Communication between the interrogation units 10, 16, 16a and a responder unit may be accomplished as described by Schuermann in U.S. Pat. No. 5,053,774. As described in Schuermann, when the responder unit 12 receives a first RF interrogation signal from the interrogation unit 10, it transmits data stored therein to the interrogation unit 10 in the form of a responsive RF communication. Typically this wireless communication between the interrogation units 10, 16, 16a and the responder units 12, 12a is by a frequency shift keying modulated RF carrier. In the preferred embodiment of the present invention, the wireless communication between interrogation units 10, 16, 16a is accomplished by a first interrogation 10 sending a wireless inquiry to the second interrogation unit 16. This wireless inquiry can be made typically by frequency shift keying (FSK) or amplitude shift keying (ASK) of the RF carrier. As mentioned, this wireless communication between the interrogation units 10, 16 is via wireless datacom transceivers. Preferably these wireless datacom transceivers have standard circuitry or standard integrated circuits for performing the frequency shift keying modulation/demodulation and the amplitude shift keying modulation/demodulation of an RF carrier. This allows both frequency shift keying for data transmission to other interrogation units 16, 16a and amplitude shift keying for data reception from other interrogation units 16, 16a. A standard circuit which might be beneficially employed for this FSK/ASK system might be the integrated circuit known as the MC3372 which performs FSK demodulation of the input signal and also provides an RSSI output which is a logarithmic AM demodulation of the input signal. Methods for frequency shift keying and amplitude shift keying of RF carriers are well known in the art of communications system design. Upon receipt by the second interrogation unit 16 of the wireless inquiry, the second interrogation unit 16 may send a wireless response through its second wireless datacom transceiver. This wireless response as with the wireless inquiry would preferably be by amplitude shift keying of an RF carrier.

Since possibly a number of interrogation units 16 may be competing to respond to a wireless inquiry, some protocol is needed in order to share the access medium. Preferably, the interrogator units 16 use a contention protocol known as carrier sense multiple access (CSMA) otherwise known as listen before talk (LBT). This protocol takes advantage of the fact that the interrogator to interrogator propagation delay is very small with respect to the data transmission time. In this protocol, when an interrogation unit 16 has a communication to send, it monitors the common carrier frequency for other communications. If the carrier frequency is free from interference, the interrogation unit 16 then performs its transmission. The interrogation unit 16 then listens for a predetermined amount of time considering maximum possible round-trip propagation time and the fact that the other interrogation unit 16 with which it is communicating must compete for channel access. If the interrogation unit 16 hears an acknowledgment during that time it knows that its transmission has been properly received, otherwise, it resends the transmission. After repeated failures, it gives up. The interrogation unit 16 which receives the wireless response determines if the response has been received error-free by looking at a frame-check sequence (FCS) or a cyclic redundancy check (CRC) which is generated as a mathematic function of the transmitted data and transmitted along with the data. The receiving interrogation unit 16 receives the data and recomputes the FCS and compares it to the received FCS. If the frame check sequences are equal, then there is a high probability that no errors have occurred in the data transmission.

Alternatively, the interrogator units 16 might use ALOHA. This protocol is particularly efficient for low network usage. In its simplest form, when an interrogation unit 16 has a communication to send, it does so. The interrogation unit 16 then listens for an amount of time equal to the maximum possible round-trip propagation time (twice the time it takes to send a transmission over the maximum transmission range between two interrogation units 16). If the interrogation unit 16 hears an acknowledgment during that time it knows that its transmission has been properly received, otherwise, it resends the transmission. After repeated failures, it gives up. The interrogation unit 16 which receives the wireless response determines if the response has been received error-free by looking at a frame-check sequence (FCS) which is generated as a mathematic function of the transmitted data and transmitted along with the data. The receiving interrogation unit 16 receives the data and recomputes the FCS and compares it to the received FCS. If the frame check sequences are equal, then there is a high probability that no errors have occurred in the data transmission.

As mentioned, standard circuits or standard integrated circuits are available for this type of modulation/demodulation. In typical demodulation circuits for frequency shift keying, a radio signal strength indicator circuit is provided. This circuit provides an analog radio signal strength indicator (RSSI) signal which generally indicates the signal level of any received wireless communications. By using this RSSI signal with simplified amplitude shift keying demodulation circuitry, one can now perform ASK demodulation of a received wireless communication. Alternatively, an amplitude shift keying demodulation circuit might be used in parallel with the frequency shift keying circuit.

The workings of wireless datacom transceivers will now be described in greater detail. Communication between an interrogation unit 16 and a responder unit 12 is accomplished when a microprocessor 18 sends a signal initiating a RF interrogation signal. A wireless datacom transceiver 19 upon receipt of this signal from the microprocessor 18 begins to modulate a carrier signal with its modulation circuit 24, preferably an ASK modulation circuit. The modulation circuit 24 is controlled by an output 34 of microprocessor 18. The modulation circuit 24 operates in conjunction with a carrier wave generator 20 to produce a modulated RF carrier wave. Carrier wave generator 20 may be turned on or off by output 22 of microprocessor 18. Amplifier receives this modulated RF carrier wave and sends it to antenna 32. The antenna 32 then transmits either this RF interrogation signal to a responder unit 12 or 12a or the wireless inquiry to another interrogation unit 16, 16a. The antenna 32 generally transmits this information through a transmitting medium such that this signal might be received by another antenna. The wireless datacom transceiver 19 may then receive responses from either a responder unit 12, 12a or another interrogation unit. This is done when the antenna 32 receives the signal through the transmitting medium such as the atmosphere or water and passes the signal on to an input amplifier 52. This input amplifier amplifies the incoming signal from the antenna 32 and sends it to a demodulation circuit 62, preferably an FSK demodulation circuit. In the preferred embodiment of the present invention, this demodulation circuit 62 is operable to perform FSK demodulation for instance from responses from the responder units 12, 12a. Additionally, in the preferred embodiment demodulation circuit 62, provides an RSSI signal for another demodulation circuit 63, preferably an amplitude shift keying demodulation circuit, which demodulates wireless communications such as from other interrogation units 16, 16a. Preferably, the demodulator unit 62 then sends an FSK demodulated bit stream to the input 64 of the microprocessor 18 and the demodulator unit 63 sends an ASK demodulated bit stream to the input 65 of the microprocessor 18. This microprocessor 18 would generally have further communication ports to communicate with by way of example, another computer via a data bus 17. The circuit as described hereinabove and as shown in FIG. 2 describes an embodiment in which an ASK demodulation circuit operates upon an RSSI signal from an FSK demodulation circuit. It would be obvious to one of ordinary skill in the art to provide ASK demodulation with a reduced amount of circuitry by providing TTL signal levels which correspond to discrete changes in amplitude of the RSSI signal. It would also be well known to operate both ASK and FSK demodulation circuits in parallel without any dependence therebetween. It is therefore intended that the appended claims encompass any such modifications or embodiments.

Although wireless communications between interrogation units has been described as the amplitude shift keying of an RF carrier, obviously other modulation schemes could be used. For example, communication between the interrogation units could be by frequency shift keying of an RF carrier signal. Obviously one method of doing this would be to use separate RF carriers for interrogation unit communications and interrogator/responder unit communications. Methods are also well known in the art such as time multiplexing of communications, where communication between interrogation units would be allocated for a given time slot and communications between an interrogation unit and a responder unit would be during another, non-overlapping time slot. Many methods are well known in the art for modulating digital data upon a carrier signal. Methods such as QAM, PSK, QPSK, trellis-coding or others are just a few examples of such methods. It is therefore intended that the appended claims encompass any such modification or embodiments.

The preferred embodiment of the present invention is described as a half-duplex system in which an interrogator unit 10, 16 sends an RF interrogation signal whose carrier wave is stopped or attenuated to listen for responses from the responder units 12. This invention could also be applied, however, to prior art transponder arrangements in which the interrogator units and responder units use separate carrier signals and the responder unit 12 responds using a different carrier frequency to the interrogator unit 10, 16 during the time period in which the carrier wave of the interrogator unit 10, 16 is still active. The inventive concept might be applied to yet other systems having different procedures of communication. It is therefore intended that the appended claims encompass any such modification or embodiments.

It has been shown that in the responder unit 12, the energy contained in the received RF carrier wave is stored and utilized for supplying assemblies necessary for the transmitting back of the stored data. The clock signals necessary for the control and synchronization are derived from the RF carrier wave which is generated immediately after termination of the RF interrogation signal in the responder unit 12.

Due to the derivation of the clock signal from the RF carrier wave signal a very good synchronization is achieved between the transmitter side and receiving side. The arrangement is not sensitive to frequency changes and calibration is therefore not necessary.

Many useful embodiments of systems advantageously incorporating the developments of the present invention may be imagined. But a few embodiments are described hereinbelow. For example, the transponder arrangement described comprising interrogation units 10, 16 and a responder unit 12 and optionally additional interrogation units 16a and additional responder units 12a might be used in a warehouse environment where the first interrogation unit might be seeking responder unit having a known address. In such an instance, the first interrogation unit 10 might send a first RF interrogation signal in which a response from a specifically addressed responder unit is requested. If within a certain amount of time the first interrogation unit 10 did not receive a response from the addressed responder unit, the first interrogation unit 10 might request that the second interrogation unit 16 and/or additional interrogation units 16a send a second or an additional RF interrogation signal addressed towards this specific responder unit. Should one or additional of these other interrogation units 16, 16a receive a response from the addressed responder unit, they might then relay this information back to first interrogation unit 10. In this manner, a network of interrogation units might be used to detect as regards to the presence or to locate a set of objects containing responder units having known addresses.

In another embodiment the interrogation units 10 might further comprise user input means. By including this user input means such as a keyboard, voice recognition circuitry, pen-based input device, or other input device known in the art, a user could communicate with another user via their respective interrogation units 10. In such an application a user might be in the field performing RF interrogations for responder units 12 and request communication with another user. By integrating the inter-interrogation unit communications with the interrogator/responder communication system, separate systems are not required to accomplish both of these functions.

Figure 4:
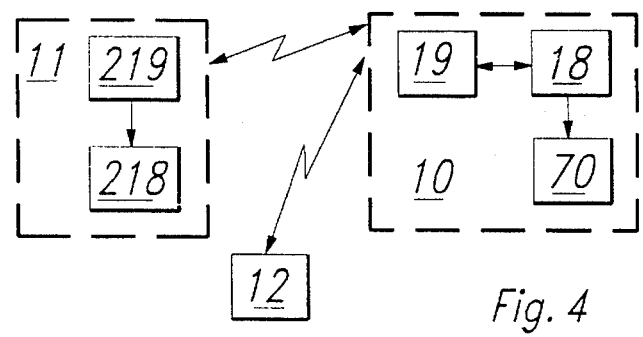
FIG. 4 is a block circuit diagram of a wireless paging system in accordance with a preferred embodiment of the invention.

Yet another embodiment, shown in FIG. 4, is a wireless paging system comprising an interrogation unit 10 which transmits at least one RF interrogation signal. Said first interrogation unit 10 comprises a first wireless datacom transceiver 19 which operates under control of a first microprocessor 18 for transmitting and receiving wireless communications, and a first presentation means 70 which operates under control of the first microprocessor 18 for notifying an operator of statuses of said wireless communications. The presentation means 70 could be a display device such as an LCD, CRT, or other display devices known in the art or could be a audio system which might communicate with the user by transmitting digitally-coded voice signals, analog modulated audio signals, or text-to-speech voice signals generated from received data. The paging system would further comprise paging control unit 11, which might be another interrogator unit, or a dedicated control unit. Said paging control unit might further comprise a second wireless datacom transceiver 219, operating under control of a second microprocessor 218, in wireless communication with said first wireless datacom transceiver 19. This paging control unit 11 could be used to notify the operator associated with said interrogator of new work instructions, emergency requests, incoming phone calls, or other changing needs. The paging control unit 11 might also act as a host unit which communicates with the interrogation unit 10 to receive data which the interrogation unit 10 has gleaned from its RF interrogations of responder units 12. The paging control unit 11 might also transmit this data to a host computer via a data bus using a second microprocessor 218 in a manner well known in the art. The paging system might further comprise a responder unit 12 which upon receipt of said RF interrogation signal transmits data stored therein back to said interrogation unit 12 by a wireless communication in the form of a responsive RF communication, said responder unit 12 comprising a responder unit energy accumulator 136 which stores energy contained in said RF interrogation signal.

A few preferred embodiments have been described in detail hereinabove. It is to be understood that the scope of the invention also comprehends embodiments different from those described, yet within the scope of the claims. For example, display devices can be raster-scanned cathode ray tubes, liquid crystal displays, plasma displays, micromirror displays or other displays of non-CRT technology.

"Microcomputer" in some contexts is used to mean that microcomputer requires a memory and "microprocessor" does not. The usage herein is that these terms can also be synonymous and refer to equivalent things. The phrase "logic" or "logic circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Internal and external connections can be ohmic, capacitive, direct or indirect, via intervening circuits or otherwise. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A multi-interrogator transponder arrangement comprising:
    a) a first interrogation unit which transmits at least one RF interrogation signal and comprises
        i) a first microprocessor,
        ii) a first carrier wave generator whose oscillation may be initiated by said first microprocessor,
        iii) a first modulator for modulating said oscillations of said first carrier wave generator, said first modulator being controlled by said first microprocessor,
        iv) a first antenna which receives at a signal input the output of said first modulator and generates a first wireless data communication into a transmitting medium and further receives a second wireless data communication from said transmitting medium and makes a first received signal available at its output, and v) a first demodulator for demodulating said first received signal and making a first demodulated bit stream available at its output to be received by said first microprocessor;

b) a second interrogation unit comprising
i) a second microprocessor,
ii) a second carrier wave generator whose oscillation may be initiated by said second microprocessor,
iii) a second modulator for modulating said oscillations of said second carrier wave generator, said second modulator being controlled by said second microprocessor,
iv) a second antenna which receives at a signal input the output of said second modulator and generates said second wireless data communication into said transmitting medium and further receives said first wireless data communication from said transmitting medium and makes a second received signal available at its output,
v) a second demodulator for demodulating said second received signal and making a second demodulated bit stream available at its output to be received by said second microprocessor; and c) a responder unit which upon receipt of said RF interrogation signal transmits data stored therein back to said first interrogation unit in the form of a modulated RF carrier, said responder unit comprising
i) a responder unit energy accumulator which stores energy contained in said RF interrogation signal, and
ii) a responder unit RF carrier wave generator.

2. The arrangement of claim 1 wherein said first interrogation unit further comprises a first output amplifier for amplifying the output of said first carrier wave generator for reception thereof by said first modulator.

3. The arrangement of claim 2 wherein said first interrogation unit further comprises a first input amplifier which receives said first received signal from said output of said first antenna and produces a first amplified received signal at its output for reception thereof by said first demodulator.

4. The arrangement of claim 3 wherein said second interrogation unit further comprises an a second output amplifier for amplifying the output of said second carrier wave generator for reception thereof by said second modulator.

5. The arrangement of claim 4 wherein said second interrogation unit further comprises a second input amplifier which receives said second received signal from said output of said second antenna and produces a second amplified received signal at its output for reception thereof by said second demodulator.

6. A method of communicating between interrogators in a multi-interrogator transponder arrangement, said method comprising the steps of:

a) transmitting a first RF interrogation signal from a first interrogator, said first RF interrogation signal for interrogating a transponder within said first interrogator's reading range;

b) receiving in said first interrogator an RF response from said transponder;

c) transmitting a second RF interrogation signal from a second interrogator, said second RF interrogation signal for interrogating another transponder within said second interrogator's reading range;

d) receiving in said second interrogator an RF response from said another transponder;

e) transmitting a wireless inquiry from said first interrogator to said second interrogator;

f) transmitting a wireless response from said second interrogator, said wireless response comprising information gathered from said another transponder in response to said second RF interrogation signal; and e) transmitting a summary message from said first interrogator to a host computer, said summary message comprising information from said first and second RF responses from said transponders.

7. The method of claim 6 wherein said wireless inquiry is made by amplitude shift keying of said first RF interrogation signal.

8. A wireless paging system comprising:
a. a first interrogator which transmits a first RF interrogation signal, said first interrogator comprising
i. a first microprocessor,
ii. a first wireless datacom transceiver operating under the control of said first microprocessor, said transceiver for transmitting and receiving wireless communications,
iii. a first presentation means operating under the control of said first microprocessor, said first presentation means for notifying an operator of statuses of said first set of wireless communications;

b. a second interrogator which transmits a second RF interrogation, said second interrogator comprising
i. a second microprocessor,
ii. a second wireless datacom transceiver operating under the control of said first microprocessor, said transceiver in wireless electrical communication with said first wireless datacom transceiver for transmitting and receiving said wireless communications, the received wireless communications being the same wireless communications as were transmitted by the first wireless datacom transceiver, and the transmitted wireless communications being the same wireless communications as were received by said first wireless datacom transceiver,
iii. a second presentation means operating under the control of said first microprocessor, said first presentation means for notifying an operator of statuses of said second set of wireless communications;

c. a paging control unit, said paging control unit comprising
i. a wireless datacom transceiver in wireless communication with said first and second wireless datacom transceivers, and
ii. an operator interface by which a paging system operator may receive notifications from said interrogators; and d. a responder which upon receipt of one of said RF interrogation signal transmits data stored therein back to the interrogator that transmitted said received RF interrogation, said data being transmitted by a wireless communication in the form of a responsive RF communication, said responder comprising a responder energy accumulator which stores energy contained in said received RF interrogation signal.

9. The wireless paging system of claim 8 wherein said presentation means is a display device.

10. The wireless paging system of claim 8 wherein said presentation means is an audio speaker.

11. The wireless paging system of claim 8 wherein said paging control unit further comprises a host interface for communicating with a host computer.

12. The method of claim 6 and further comprising the step of providing status information to a user of said first interrogator by means of a visual display.

* * * * *